Aug. 9, 1927.
R. C. FARR
1,638,479
WATER DRAIN FOR AUTOMOBILE HOODS
Filed Feb. 25, 1926
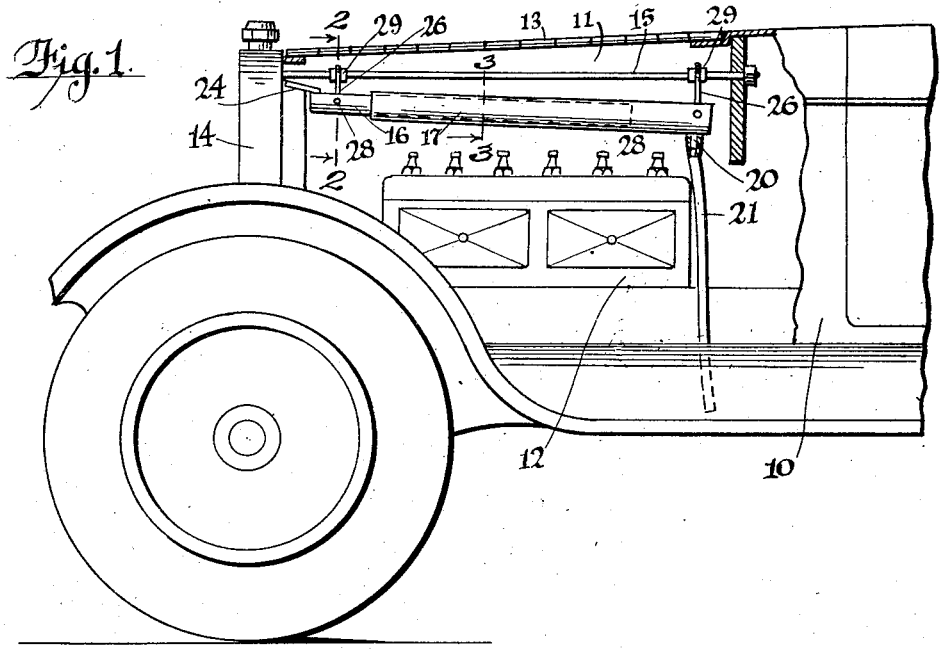
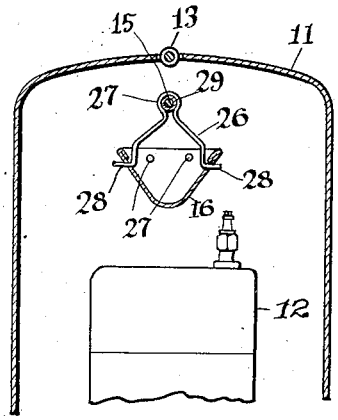
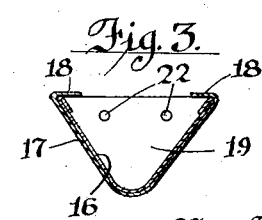
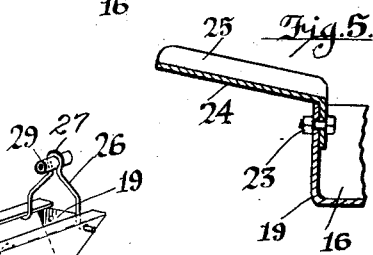
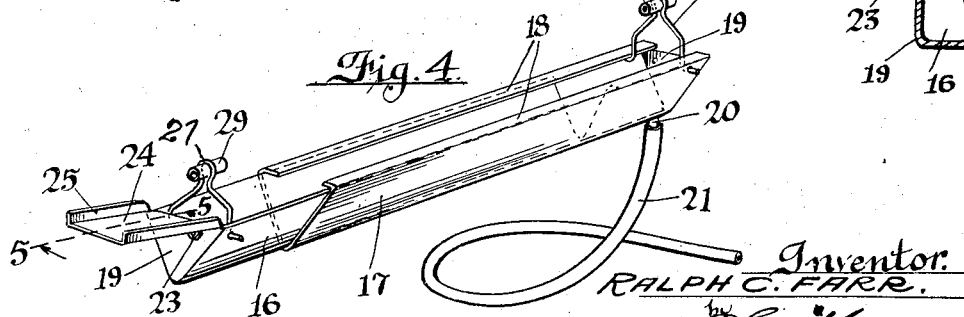
Inventor:
RALPH C. FARR.
by Martin O. Smith
Attorney.

Patented Aug. 9, 1927.

1,638,479

UNITED STATES PATENT OFFICE.

RALPH C. FARR, OF SANTA BARBARA, CALIFORNIA.

WATER DRAIN FOR AUTOMOBILE HOODS.

Application filed February 25, 1926. Serial No. 90,500.

My invention relates to a water drain for automobiles, the principal object of my invention being to provide a receptacle that is adapted to be positioned beneath the hinge joint at the top of the hood and which receptacle functions as a combined catch basin and drain for any water that may pass through said joint, thereby preventing said water from passing into the upper portion of the engine and short-circuiting the spark plugs or other parts of the electrical equipment that is generally associated with automobile engines.

Further objects of my invention are to provide a combined catch basin and drain of the character referred to that is relatively simple in construction, capable of being easily and quickly installed and which is readily adjustable in order that it may be applied to practically all makes of cars regardless of the length of the hood that serves as a cover for the engine.

With the foregoing and other objects in view, my invention consists in certain novel features of construction and arrangement of parts that will hereinafter be more fully described and claimed and illustrated in the accompanying drawing, in which—

Fig. 1 is an elevational view of the front portion of an automobile with parts broken away and in section and showing my improved drain in position for use.

Fig. 2 is an enlarged cross section taken approximately on the line 2—2 of Fig. 1.

Fig. 3 is an enlarged cross section taken on the line 3—3 of Fig. 1.

Fig. 4 is a perspective view of the drain.

Fig. 5 is a sectional view taken on the line 5—5 of Fig. 4.

Referring by numerals to the accompanying drawings which illustrate a practical embodiment of my invention, 10 designates the body of an automobile, 11 the usual hood that serves as a cover for the engine 12, said hood being provided at its top with the usual centrally arranged longitudinally extending hinge 13 and which hood extends from the body of the automobile to the radiator 14 thereof.

Extending from a fixed part of the vehicle body to the upper central portion of the radiator 14 is a rod 15 that functions as a combined support and tie for connecting the upper portion of said radiator to the vehicle body. This rod is present in practically all automobiles and as it occupies a position directly beneath the hinge 13 of the hood, it provides an ideal support for my improved drain.

The body of my improved drain is formed in two parts, the same being designated respectively by the numerals 16 and 17, said parts being substantially V-shaped in cross section so as to form a trough-shaped structure and the member 16 is arranged to slide within the member 17. In order that the members 16 and 17 may be retained for assembled position, relatively narrow inwardly presented flanges 18 are provided on the upper edges of member 17 and which flanges overlie the upper edges of member 16. This construction of the body of the drain enables the same to be adjusted in length so as to be applied to different makes of cars or cars having hoods of different lengths.

The outer ends of the trough-shaped members 16 and 17 are closed by end walls or plates 19 and depending from the outer end of member 17 is a nipple 20 to which is applied one end of a small flexible tube 21 and the latter extending downward to a point beneath the base of the engine, thus providing an outlet duct to carry off all water that accumulates in the receptacle and drain.

The upper ends of the end walls 19 are provided with perforations 22 that are adapted to receive bolts or like fastening devices 23, and which latter are utilized for securing to said end walls a short inclined plate such as 24 having low side walls 25. Thus a short extension member may be applied to one or both ends of the trough-shaped drain and which extension member projects slightly beyond the parts on which the ends of the hood 11 rest in order to insure the catching of any water that may leak through the end portions of the hinge 13.

The trough-shaped drain thus constructed is suspended from rod 15 by means of wishbone-shaped hangers 26 that are constructed from resilient wire, each hanger being provided at its center with a loop 27 that passes around the rod 15 and the lower ends of the legs of each hanger being bent outwardly to form short hooks 28 that engage through apertures formed in the side walls of the members 16 and 17.

In order to prevent rattling, I prefer to arrange in the loops 27 short tubular sections 29 of rubber, or like material. The hanger that supports the rear end of the drain is slightly longer than the hanger at the front end of said drain and thus the drain gradually declines toward its rear end so that all water caught in the drain will by gravity flow toward the outlet nipple 20 that is located at the outer end of member 17.

The body of the drain comprising the parts 16 and 17 may be readily disconnected from hangers 26 by merely springing the lower portion of the legs of said hangers toward each other so as to disengage the hooks 28 from the aperture in which they are normally engaged. In order to secure the hose 21 to the nipple 20, the latter may be coated with shellac before the end of the hose is applied thereto.

With my improved receptacle and drain in proper position beneath the hinge joint in the top of an automobile hood, all water that passes through the hinge joint as a result of rain or while the car is being washed, will be caught in the drain and carried off through outlet tube 21, thus effectually preventing the water from passing downward onto the top of the engine and onto the electrical equipment that is associated therewith.

The receptacle and drain may be economically produced and installed, may be readily adjusted so as to be applied to cars having different lengths of hoods and the use of the drain entirely eliminates a source of trouble very frequently encountered in the operation of automobiles, namely the short-circuiting of the electrical equipment as a result of the contact or accumulation of water upon certain parts of said electrical equipment.

It will be understood that minor changes in the size, form and construction of the various parts of my improved drain may be made and substituted for those herein shown and described without departing from the spirit of my invention, the scope of which is set forth in the appended claim.

I claim as my invention:

A water drain for automobile hoods comprising a pair of telescopically connected trough shaped members, a hanger pivotally and detachably connected to each trough shaped member, one end of one of the trough shaped members being provided with an outlet opening and an extension drip plate extending outwardly from the upper portion of the outer end of the other one of said telescopic members.

In testimony whereof I affix my signature.

RALPH C. FARR.